(12) United States Patent
Chuang et al.

(10) Patent No.: US 6,741,319 B2
(45) Date of Patent: May 25, 2004

(54) METHOD FOR SEPARATING SUBSTRATES IN LIQUID CRYSTAL DISPLAY

(75) Inventors: Ta-Ko Chuang, Taoyuan Shien (TW); Sakae Tanaka, Taoyuan Shien (TW)

(73) Assignee: Hannstar Display Corp., Taipei (TW)

( * ) Notice: Subject to any disclaimer, the term of this patent is extended or adjusted under 35 U.S.C. 154(b) by 6 days.

(21) Appl. No.: 10/192,038

(22) Filed: Jul. 10, 2002

(65) Prior Publication Data

US 2003/0043332 A1 Mar. 6, 2003

(30) Foreign Application Priority Data

Sep. 5, 2001 (TW) ........................... 90122025 A

(51) Int. Cl.⁷ ............... G02F 1/1339; G02F 1/13; H01J 9/24
(52) U.S. Cl. ............... 349/187; 349/153; 445/23; 445/24
(58) Field of Search ................ 349/153, 187, 349/158; 445/23, 24

(56) References Cited

U.S. PATENT DOCUMENTS

| 6,010,384 A | * | 1/2000 | Nishino et al. ............ 445/24 |
| 6,013,563 A | * | 1/2000 | Henley et al. ............ 438/458 |
| 6,420,678 B1 | * | 7/2002 | Hoekstra ............ 219/121.75 |

FOREIGN PATENT DOCUMENTS

JP          05088136      *  4/1993  ............. G02F/1/13

* cited by examiner

*Primary Examiner*—Tarifur R. Chowdhury
*Assistant Examiner*—Jeanne Andrea Di Grazio
(74) *Attorney, Agent, or Firm*—Mathews, Collins, Shepherd & McKay, P.A.

(57) ABSTRACT

A process for separating substrates in liquid crystal display is disclosed. The process for separating substrates in liquid crystal display includes step of providing a first substrate and a second substrate, wherein the first and second substrates being combined together by seal, forming a scribing line on the first substrate, and separating the first substrate into at least two parts along the scribing line by exerting air pressure upon the second substrate.

14 Claims, 18 Drawing Sheets

METHOD FOR SEPARATING SUBSTRATES IN LIQUID CRYSTAL DISPLAY

FIELD OF THE INVENTION

This invention relates to a process for separating substrates, and more particularly to a process for separating substrates in liquid crystal display.

BACKGROUND OF THE INVENTION

With the developments and improvements on display-related technology, a active-matrix liquid crystal display (AMLCD) seems to be more and more popular than before and even tends to become a main stream on the market. Nowadays a liquid crystal display is most popular display in all kinds of the active-matrix liquid crystal display (AMLCD). Because of the different requirements, there are many sizes of displays. For forming displays with different sizes, the process for separating LCD substrate into small LCD cell units, becomes a very important technology.

Please refer to FIGS. 1 and 2 which are respectively the lateral view and front view showing a traditional method for cutting substrates. As shown in FIG. 1, an upper substrate 11 and a lower substrate 12 are made of glass substrates and combined together by seal 13. In order to form a liquid crystal display in required size, the glass substrates 11 and 12 must be cut in required size correspondingly. Firstly, a scribing line 10 is formed on the lower substrate 12 by scribing the lower substrate 12 on a stage 15 with a diamond blade or a hard metal wheel made of Tungsten Carbide. Then, as shown in FIGS. 1 and 2, the upper substrate 11 is exerted an external force by a breaking bar 14 along the y-axis, thereby allowing the lower substrate 12 to be separated into two parts along the scribing line 10. Finally, the upper substrate 11 and the lower substrate 12 are exchanged and the above-mentioned steps are repeated to treat with the upper substrate 11 so as to separate the upper substrate 11 into two parts. Accordingly, the glass substrates 11 and 12 are cut in required size.

Although the traditional method for cutting substrates can make the upper substrate 11 and the lower substrate 12 separated, it also leads lots of disadvantages including the following:

1. Particles, debris and dust are produced during the cut process.
2. Low throughput.
3. The mechanical scribing method would produce unavoidable micro-cracks, that results in the requirements of post-process such as grinding, beveling and cleaning process.
4. Vapor diffuses into the panel after the cleaning process.
5. The thickness of the substrate capable of being cut is limited.

Therefore, the traditional method still needs to be improved for the common uses of the active-matrix liquid crystal display (AMLCD).

SUMMARY OF THE INVENTION

It is therefore an object of the present invention to provide a process for separating substrates in liquid crystal display. The method comprises steps of providing a first substrate and a second substrate, the first and second substrates being combined together by seal, forming a scribing line on the first substrate, and separating the first substrate into at least two parts along the scribing line by exerting air pressure upon the second substrate.

In accordance with one aspect of the present invention, the first substrate and second substrates are the substrate pervious to light. Preferably the first and second substrates are glass substrates.

In accordance with another aspect of the present invention, the step of forming the scribing line on the first substrate is performed by a diamond blade, a hard metal wheel or a laser.

In accordance with another aspect of the present invention, the hard metal wheel is made of Tungsten Carbide.

In accordance with another aspect of the present invention, the air pressure is provided by an air nozzle, plural air nozzles, an air membrane or plural air membranes.

In accordance with another aspect of the present invention, the air membrane is fixed by a supporting frame.

In accordance with another aspect of the present invention, the supporting frame is a device moving along said scribing line.

In accordance with another aspect of the present invention, after the step of separating the first substrate into at least two parts, the method further comprises steps of making the first substrate and the second substrate exchanged, forming another scribing line on the second substrate, and separating the second substrate along another scribing line into at least two parts by exerting the air pressure upon the first substrate.

It is further an object of the present invention to provide a process for separating substrates in liquid crystal display. The process comprises steps of providing a first substrate and a second substrate, the first and second substrates being combined together by seal, forming a scribing line on the first substrate, providing an attaching medium on the second substrate, and separating the first substrate into at least two parts along the scribing line by exerting an external force upon the second substrate.

In accordance with another aspect of the present invention, the external force is provided by an air nozzle, plural air nozzles, an air membrane, plural air membranes, a breaking bar, a roller and plural rollers.

In accordance with another aspect of the present invention, the breaking bar has a vibratility.

In accordance with another aspect of the present invention, the breaking bar has at least one extending portion.

In accordance with another aspect of the present invention, the breaking bar has a contact portion made of polymer.

In accordance with another aspect of the present invention, the roller is fixed on a supporter.

In accordance with another aspect of the present invention, the supporter is a device moving along said scribing line.

In accordance with another aspect of the present invention, the attaching medium is a tape and/or a steel wire.

In accordance with another aspect of the present invention, the tape has one of flat-shape and arc-shape.

In accordance with another aspect of the present invention, the attaching medium is a tape and/or a steel wire encapsulated with a polymer sheath.

DETAILED DESCRIPTION OF THE PREFERRED EMBODIMENT

The present invention will now be described more specifically with reference to the following embodiments. It is to be noted that the following description of the preferred embodiment of this invention is presented herein for purpose of illustration and description only; it is not intended to be exhaustive or to be limited to the precise form disclosed.

Figure 3A:
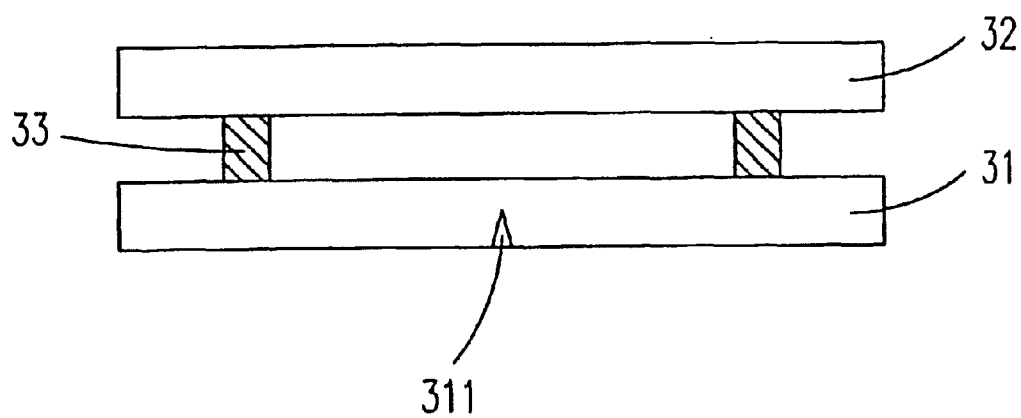
FIGS. 3(a)–(c) are the schematic views showing a process for cutting substrates by employing an air pressure device according to a preferred embodiment of the present invention.
Figure 3B:
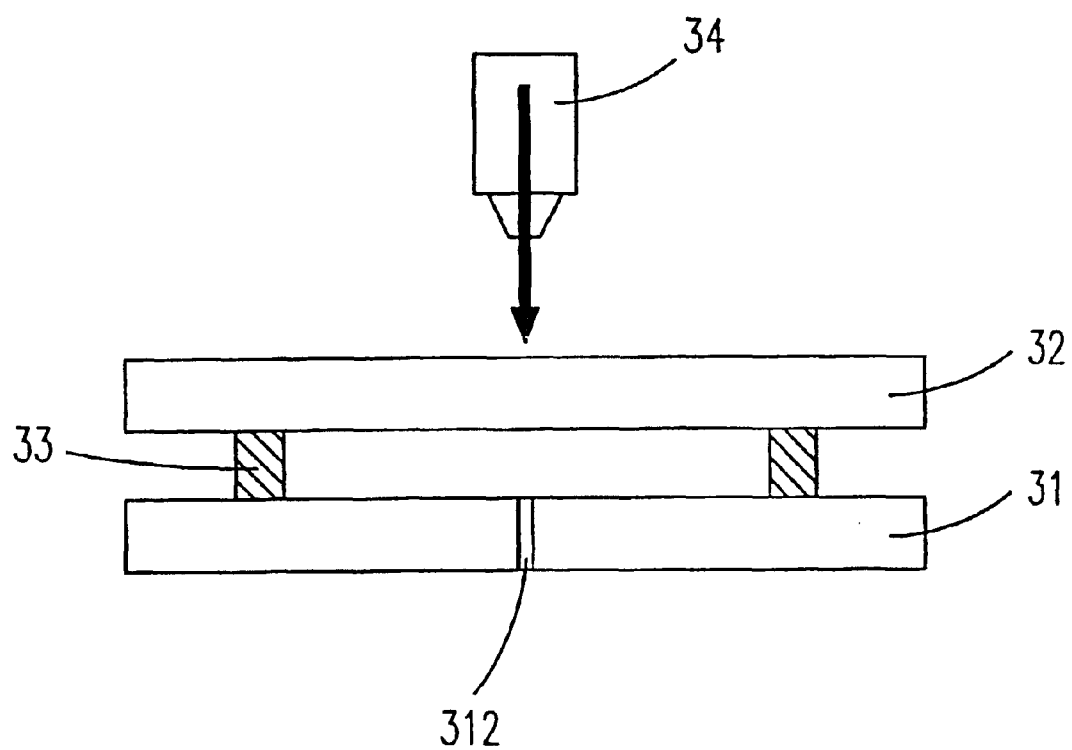
Figure 3C:
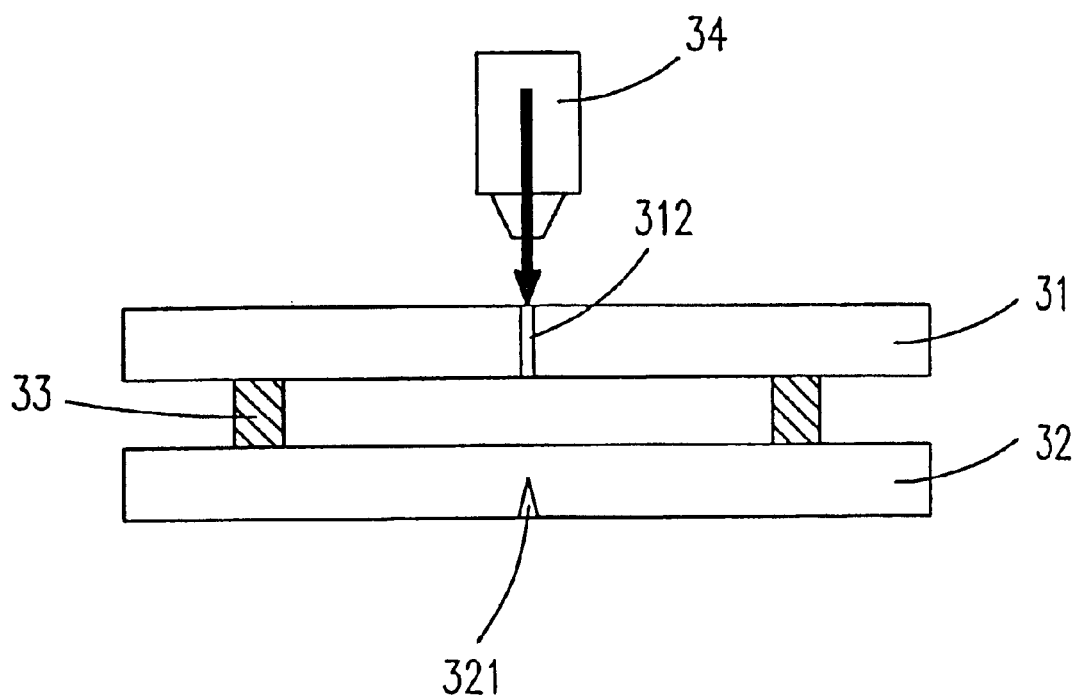

Please refer to FIGS. 3(a)–(c) which are the schematic views showing a process for cutting substrates by employing an air pressure device according to a preferred embodiment of the present invention. As shown in FIG. 3(a), two substrates 31 and 32 made of glass substrates and combined together by seal 33 are provided. In order to form a liquid crystal display in required size, the substrates 31 and 32 are cut in required size correspondingly. The process and device for cutting the substrates are described as below.

Please refer to FIG. 3(a). Firstly, a scribing line 311 is formed on the substrate 31 by scribing the substrate 31 on a stage (not shown) with a diamond blade, a laser or a hard metal wheel made of Tungsten Carbide (not shown). Then, an air nozzle 34 is employed to provide the air pressure and external force upon the substrate 32 so that a slit 312 is formed along the scribing line 311 of the substrate 31, as shown in FIG. 3(b) Finally, as shown in FIG. 3(c), the substrate 31 and substrate 32 are exchanged and the above-mentioned steps are repeated to treat with the substrate 32, thereby separating the substrates 31 and 32 into two parts, respectively.

Figure 1:
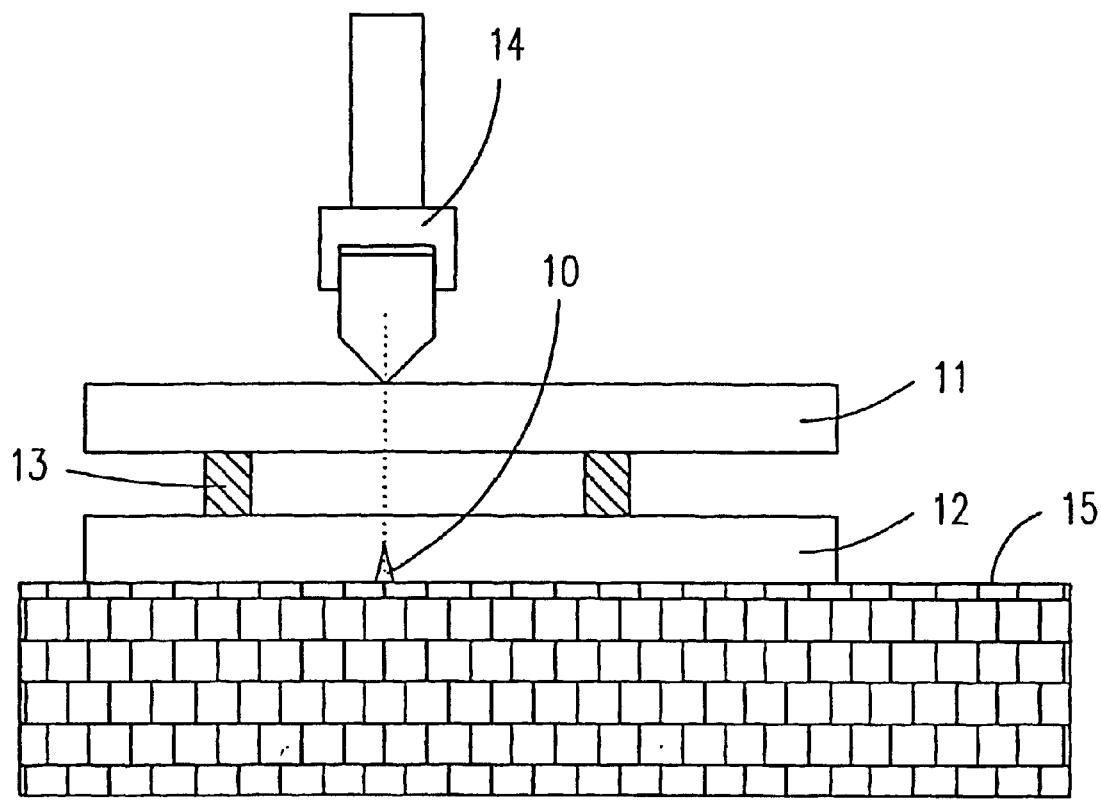
FIG. 1 is the lateral view showing a traditional method for cutting substrates.
Figure 2:
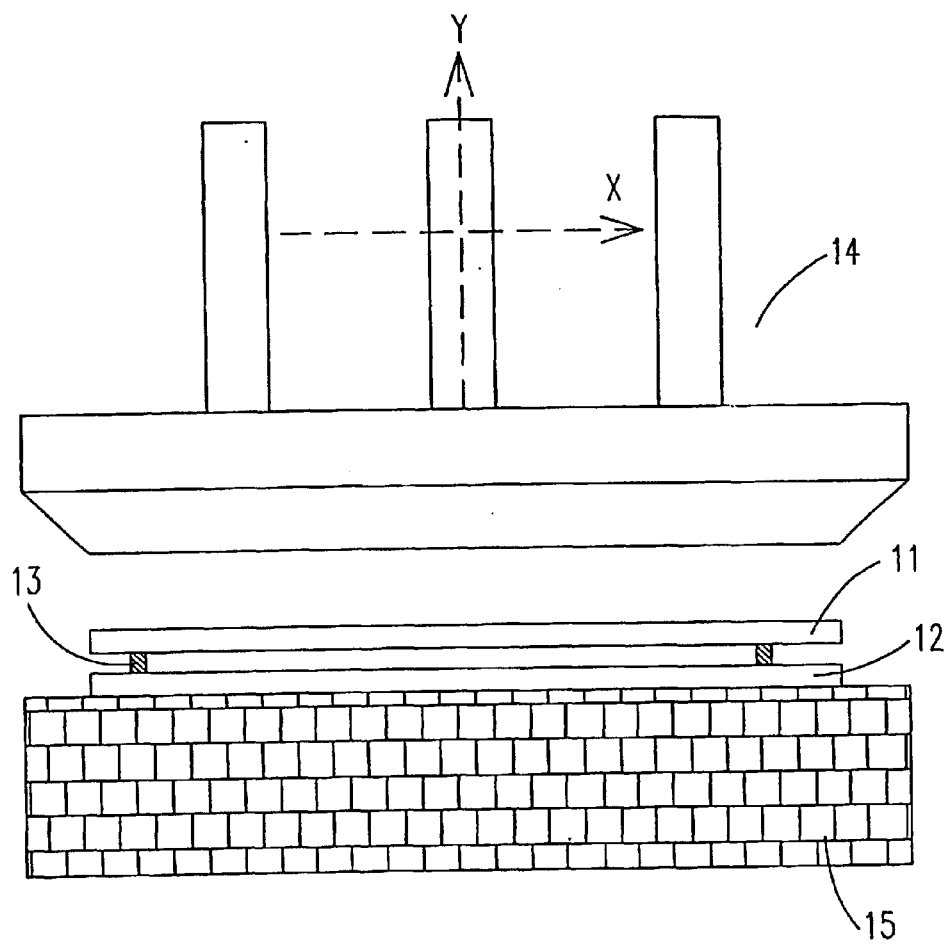
FIG. 2 is the front view showing a traditional method for cutting substrates.
Figure 4:
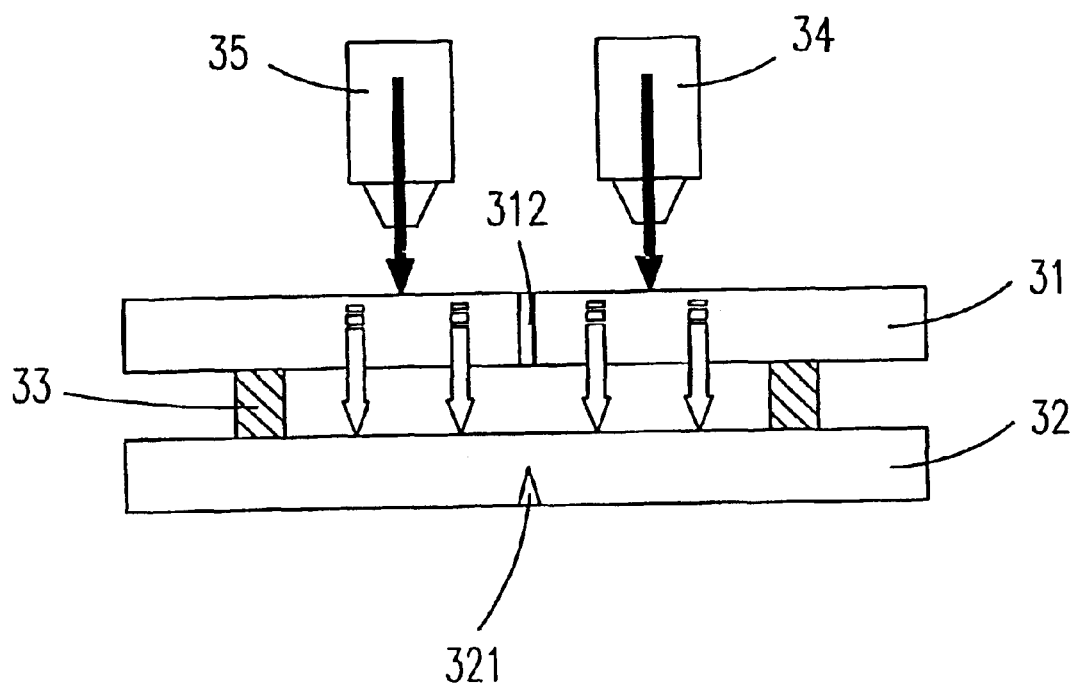
FIG. 4 is a schematic view showing a process for cutting substrates by employing plural air nozzles according to the preferred embodiment in FIGS. 3(a)–(c)

Alternatively, plural air nozzles 34 and 35 can be employed to provide the air pressure and external force upon the substrate 31, as shown in FIG. 4, so that the external force exerted upon the substrate 31 is distributed over the surface of the substrate 31 equally. By employing the air nozzle to replace the breaking bar 14 as shown in FIG. 1, the substrates can be separated into several parts without touching the surface thereof In addition, an irregular cross-section formed along the scribing line of the substrate due to the unsuitable stress residual by using the traditional method can be avoided. Therefore, an unnecessary step of polishing the irregular cross-section of the separated parts can also be avoided and the thickness of the substrate is no more limited by employing the air nozzle.

Figure 5:
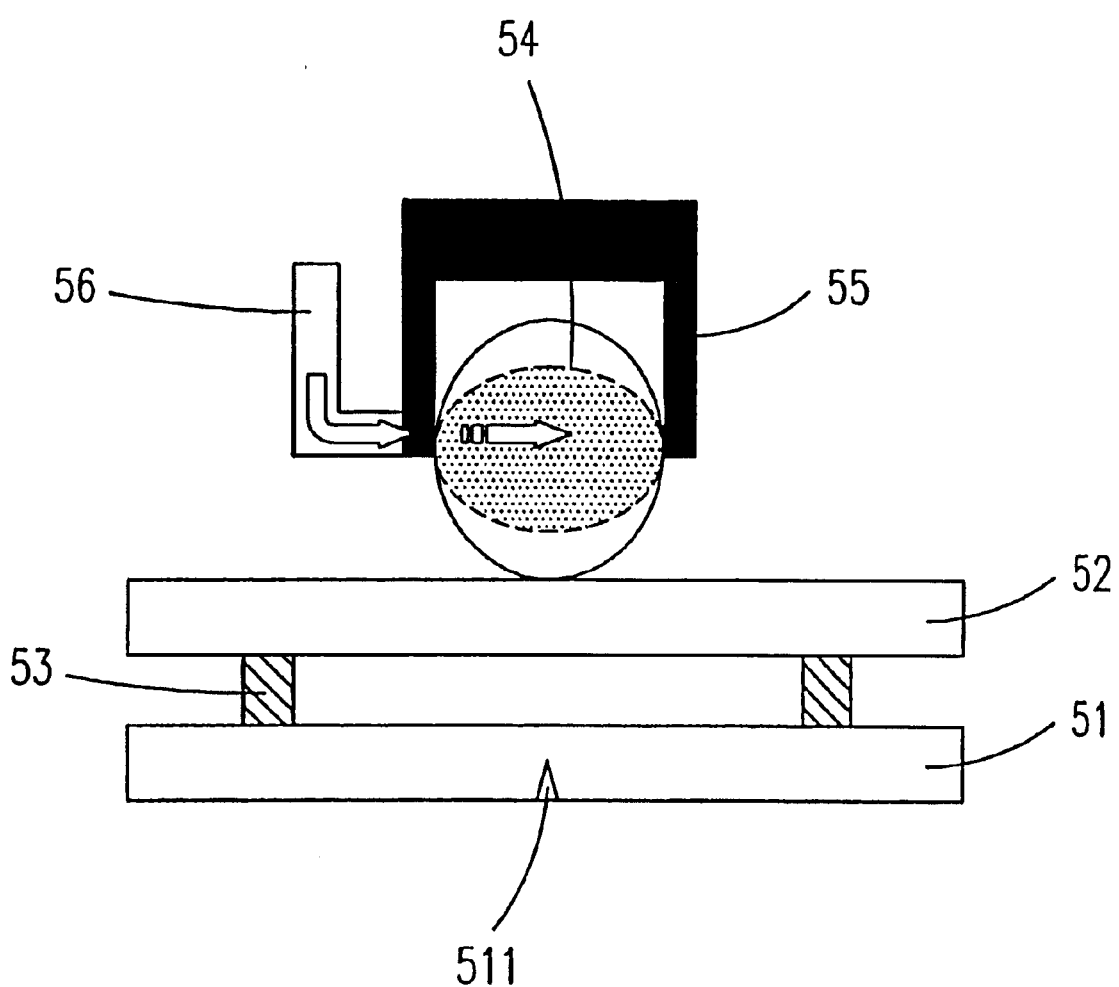
FIG. 5 is a schematic view showing a process for cutting substrates by employing an air membrane according to another preferred embodiment of the present invention.

Please refer to FIG. 5 which is a schematic view showing a process for cutting substrates by employing an air membrane according to another preferred embodiment of the present invention. As shown in FIG. 5, the substrates 51 and 52 made of glass substrates and combined together by seal 53 are provided. Firstly, a scribing line 511 is formed on the substrate 51 by scribing the substrate 51 on a stage (not shown) with a diamond blade, a laser or a hard metal wheel made of Tungsten Carbide (not shown). Then, an air membrane 54 is employed to provide the external force upon the surface of the substrate 52 so that a slit (not shown) is formed along the scribing line 511 of the substrate 51. The air membrane 54 is fixed by a supporter 55 and filled with the air via an duct 56. Finally, the substrate 51 and the substrate 52 are exchanged and the above-mentioned steps are repeated to treat with the substrate 52, thereby separating the substrates 51 and 52 into two parts, respectively.

Figure 6:
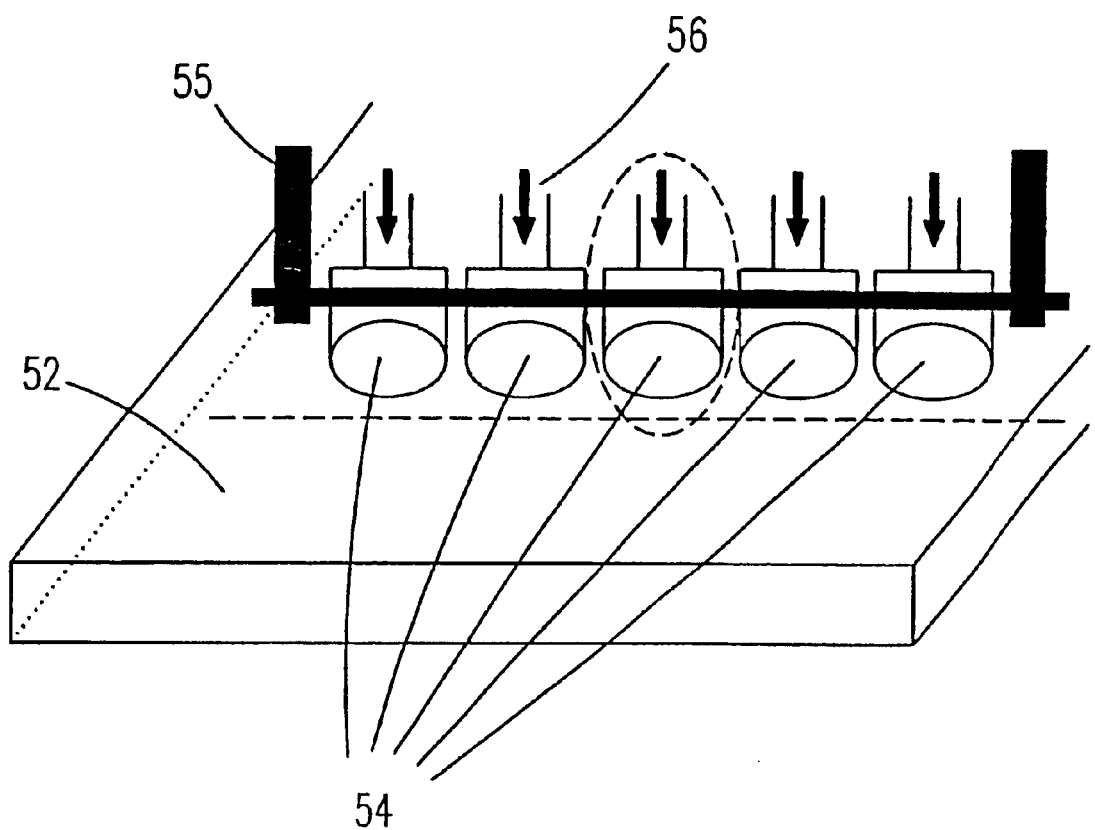
FIG. 6 is a schematic view showing a process for cutting substrates by employing plural air membranes according to the preferred embodiment in FIG. 5.

Please refer to FIG. 6. Plural air membranes 54 can also be employed to provide the external force upon the substrate 52 so that the external force exerted upon the surface of the substrate 52 is distributed over the surface of the substrate 52 equally. Certainly, the air membranes 54 can be fixed by an identical supporter 55 and filled with the air via individual duct 56. By employing the air membrane to replace the breaking bar 14 as shown in FIG. 1, the substrates can be separated into several parts and an irregular cross-section formed along the scribing line of the substrate due to the unsuitable stress residual by using the traditional method can be avoided. Therefore, an unnecessary step of polishing the irregular cross-section of the separated parts can also be avoided and the thickness of the substrate is no more limited by employing the air membranes.

Figure 7:
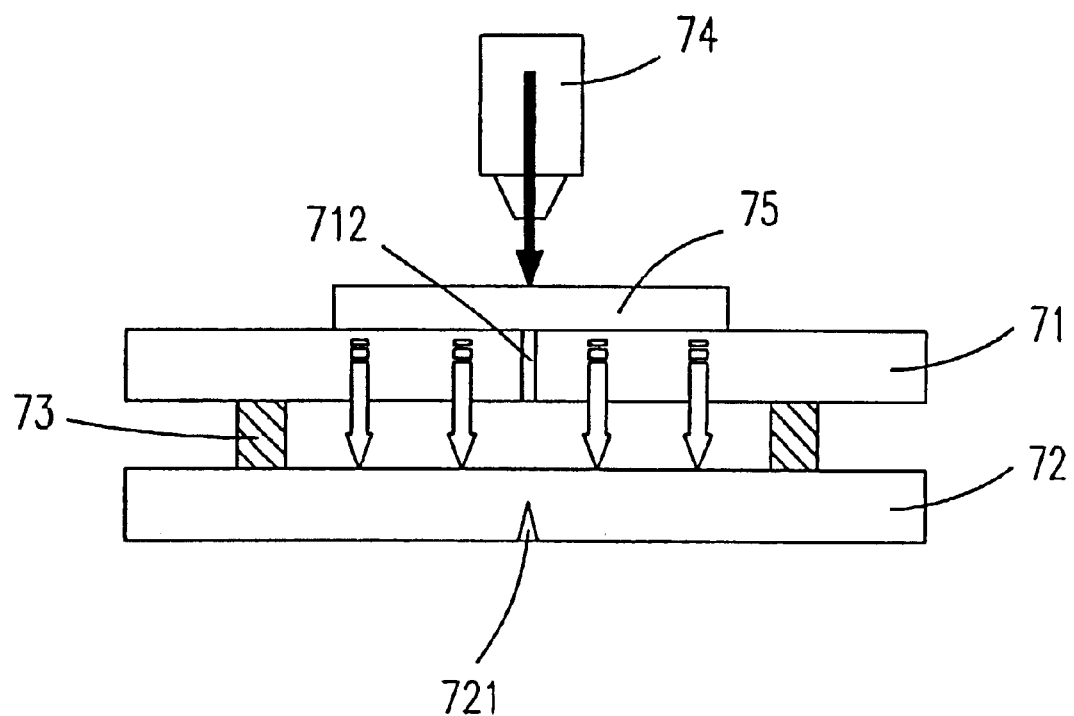
FIG. 7 is a schematic view showing a process for cutting substrates by employing an attaching medium according to another preferred embodiment of the present invention.
Figure 8:
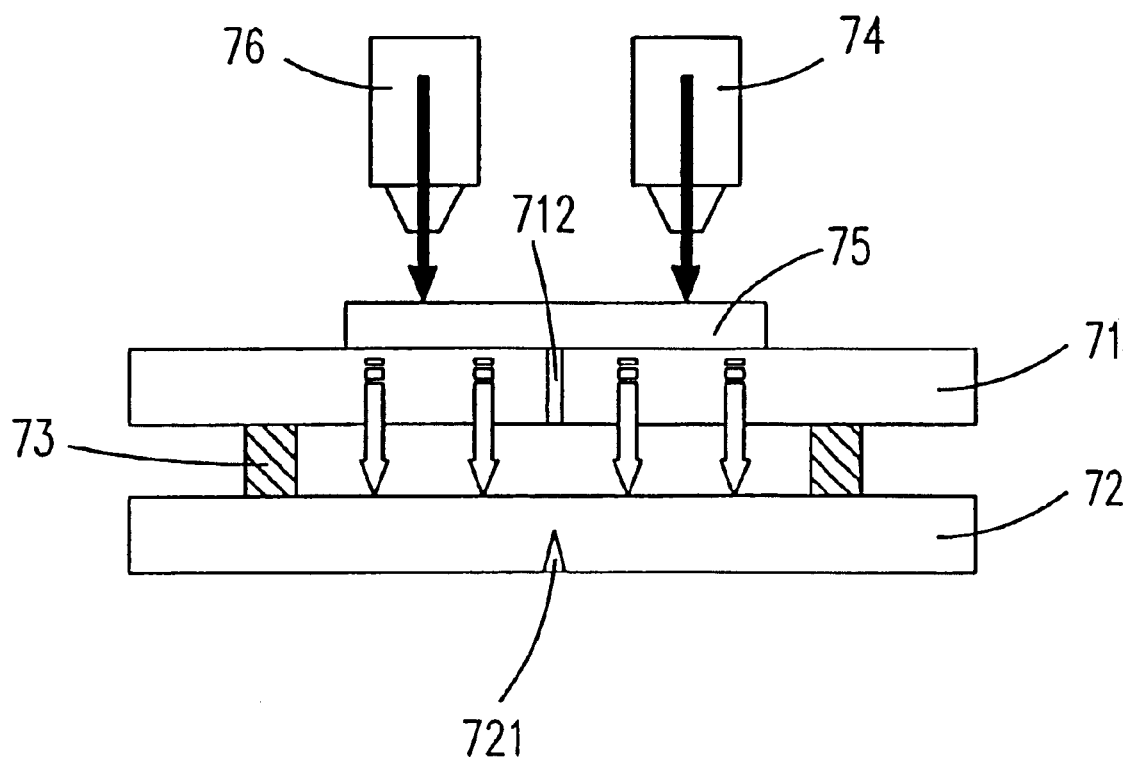
FIG. 8 is a schematic view showing a process for cutting substrates by employing plural air nozzles and attach medium according to the preferred embodiment in FIG. 7.

Please refer to FIG. 7 which is a schematic view showing a process for cutting substrates by employing an attaching medium according to another preferred embodiment of the present invention. As shown in FIG. 7, a slit 712 is formed on the substrate 71 by the steps the same as shown in FIGS. 3(a)–(b). Then, an attaching medium 75, such as a tape, is attached on the slit 712 of the substrate 71. Finally, the substrate 71 is exerted an air pressure by an air nozzle 74 to allow the substrate 72 having a scribing line 721 being separated into two parts. Due to the protection and buffer effect of the attaching medium 75, the external force exerted by the air pressure device 75 can be spread over the surface of the substrate 71 via the attaching medium 75. Therefore, the situation of forming irregular cross-section on the substrate 72 due to the concentration of stress can be avoided. Alternatively, plural air nozzles 74 and 76 can be employed to provide the air pressure and external force upon the substrate 71, as shown in FIG. 8, so that the external force exerted on the substrate 71 is equally spread over the surface of the substrate 71.

Figure 9:
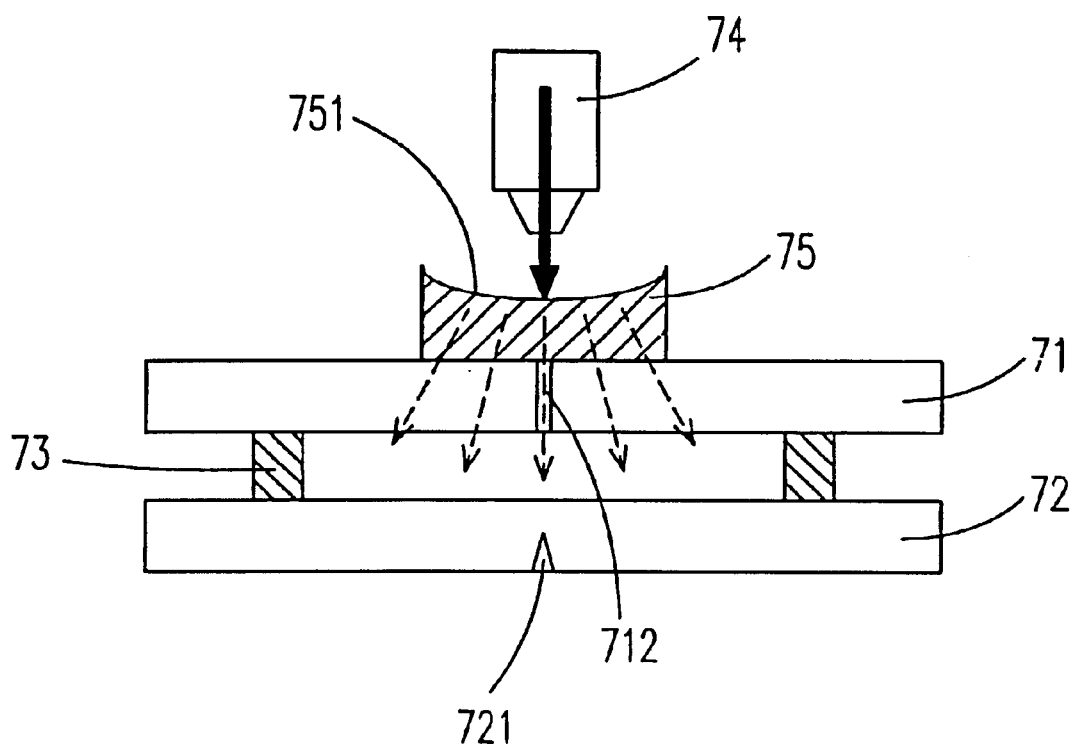
FIG. 9 is a schematic view showing a process for cutting substrates by employing an attaching medium having arc-shaped surface according to another preferred embodiment of the present invention.

Please refer to FIG. 9, which is a schematic view showing a process for cutting substrates by employing an attaching medium having an arc-shaped surface according to another preferred embodiment of the present invention. As shown in FIG. 9, the attaching medium 75 has an arc-shaped surface 751 for receiving the air pressure thereon. By employing the attaching medium 75 having an arc-shaped surface 751, the external force exerted upon the substrate 71 is dispersed on the surface of the substrate 71 equally.

Figure 10:
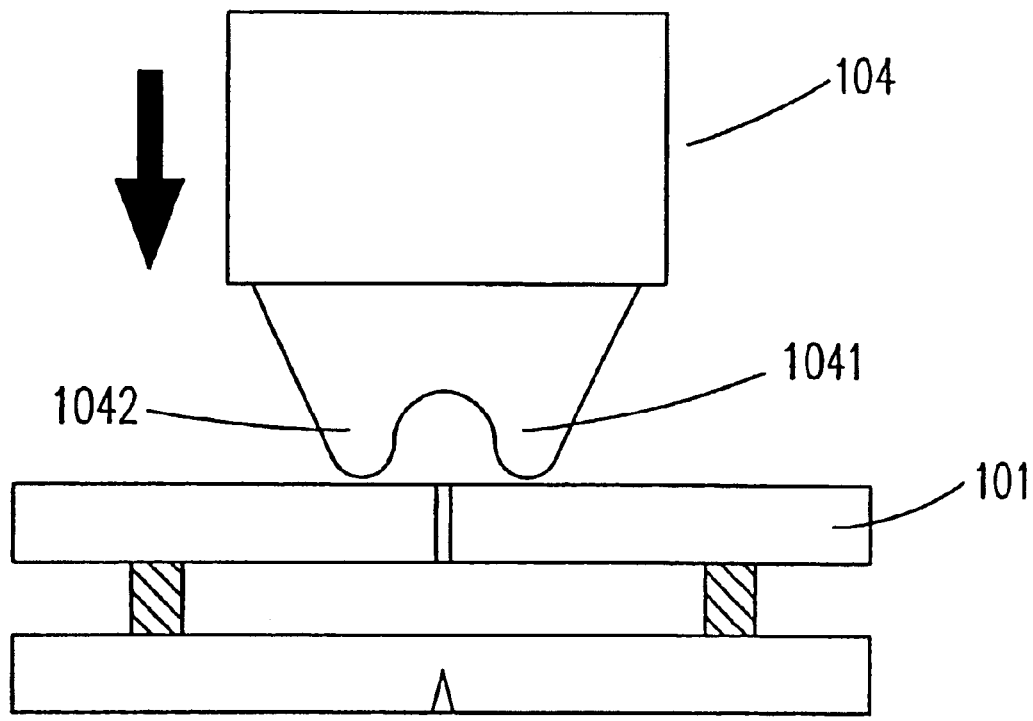
FIG. 10 is a schematic view showing a process for cutting substrates by employing a breaking bar having two extending portion according to another preferred embodiment of the present invention.

Please refer to FIG. 10 which is a schematic view showing a process for cutting substrates by employing a breaking bar having two extending portions according to another preferred embodiment of the present invention. As shown in FIG. 10, a breaking bar 104 is employed to provide the external force for breaking and separating the substrates into several parts. The breaking bar 104 has two extending portions 1041 and 1042 for contacting with the surface of the substrate 101 at two areas corresponding to the two extending portions when the breaking bar 104 touches the surface of the substrate 101. Therefore, the situation of forming irregular cross-section on the separated parts due to the concentration of stress can be avoided.

Figure 11:
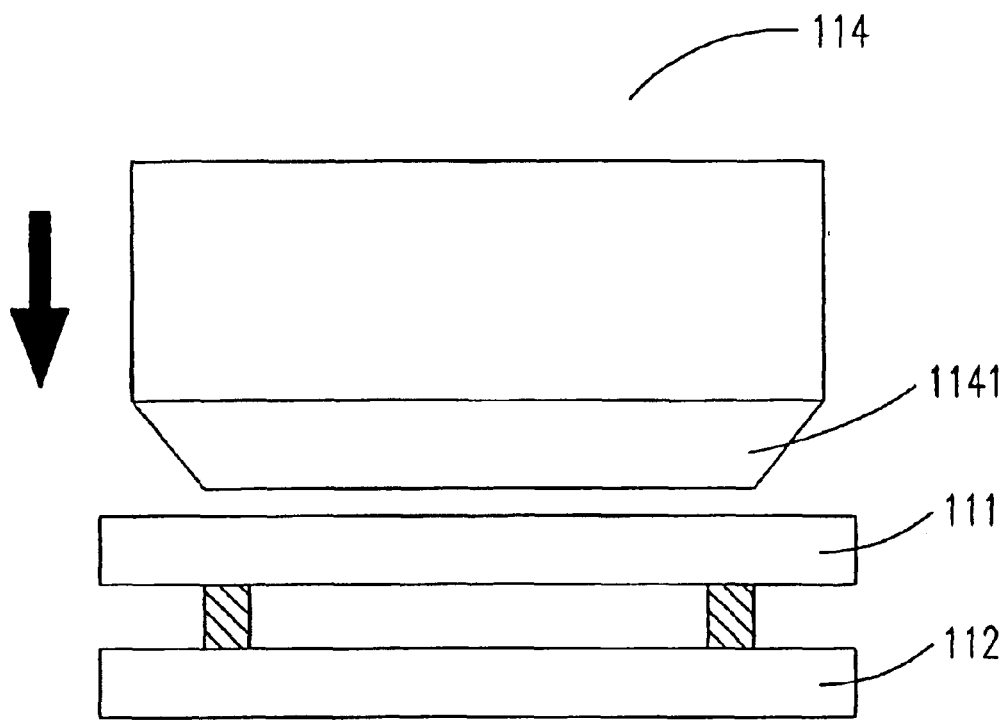
FIG. 11 is the lateral view showing a process for cutting substrates by employing a breaking bar having a contact portion made of polymer according to FIG. 10.

Please refer to FIG. 11 which is the lateral view showing a process for cutting substrates by employing a breaking bar having a contact portion made of polymer according to FIG. 10. Similarly, as shown in FIG. 11, a breaking bar 114 is employed to provide the external force for breaking and separating the substrates 111 and 112 into several parts. The breaking bar 114 has a contact portion 1141 for contacting with the surface of the substrate 111 when the breaking bar 114 touches the surface of the substrate 111. The contact portion 1141 of the breaking bar 114 is made of polymer for proving the buffer effect to the substrates 111 and 112 when the external force exerted upon the surface of the substrates 111 and 112. Therefore, the situation of forming irregular cross-section on the substrates 111 and 112 due to the concentration of stress can be avoided.

Figure 12:
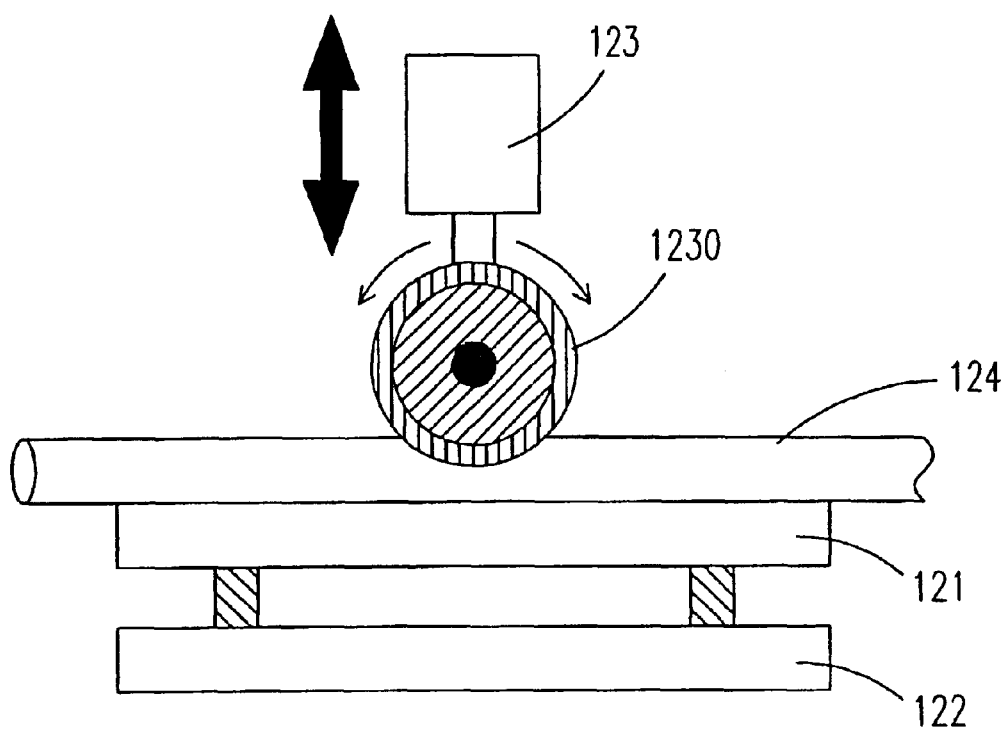
FIG. 12 is a schematic view showing a process for cutting substrates by employing a breaking device and a buffer device according to another preferred embodiment of the present invention.

Please refer to FIG. 12 which is a schematic view showing a process for cutting substrates by employing a breaking device and a buffer device according to another preferred embodiment of the present invention. As shown in FIG. 12, a breaking device 123 with vibration function is employed to provide the external force upon the substrates 121 and 122 for breaking and separating the substrates 121 and 122 into several parts. Before breaking the substrate 122, a buffer device 124 is attached on the surface of the substrate 121 for providing the buffer effect to the substrates 121 when the breaking device 123 contacts with the surface of the substrates 121. The breaking device 123 has a contact portion 1230 for contacting with the buffer device 124 and provides the external force to break the substrate 122 when the breaking device 123 vibrates up and down. Preferably, the buffer device 124 is a steel wire and the contact portion 1230 is a roller capable of sliding along the steel wire. Therefore, by employing the buffer device 124, the situation of forming irregular cross-section on the substrate 122 due to the concentration of stress can be avoided.

Figure 13:
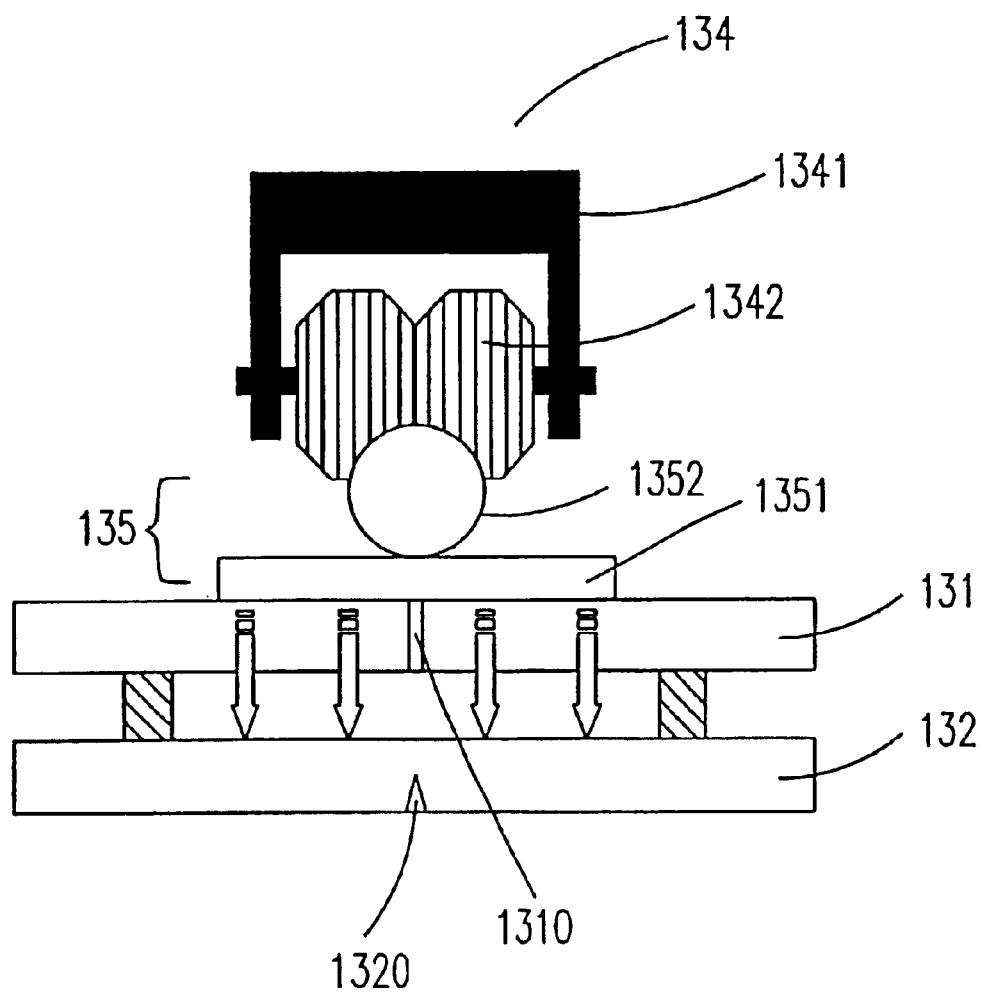
FIG. 13 is a schematic view showing a process for cutting substrates by employing a breaking roller and a buffer device according to another preferred embodiment of the present invention.

Please refer to FIG. 13 which is a schematic view showing a process for cutting substrates by employing a breaking device and a buffer device according to another preferred embodiment of the present invention. Firstly, a slit 1310 is formed on the substrate 131, a scribing line 1320 is formed on the substrate 132, and a buffer device 135 is attached on the surface of the substrate 131 to cover the slit 1310. Then, a breaking bar 134 with vibration function is employed to break and separate the substrates 131 and 132 into several parts. As shown in FIG. 13, the breaking bar 134 has a supporter 1341 and a roller 1342. The roller 1342 is fixed on the supporter 1341 for contacting with the buffer device 135. The buffer device 135 has a tape 1351 for dispersing the external force exerted upon the surface of the substrate 131 and a steel wire 1352 for allowing the roller 1342 to slide thereon. When the breaking bar 134 vibrates up and down and moves along the steel wire 1352, the tape 1351 and steel wire 1352 can provide the buffer effect to the substrate for avoiding impact between the breaking bar and the substrate directly. Therefore, the situation of forming irregular cross-section on the substrate 132 due to the concentration of stress can be avoided.

Figure 14:
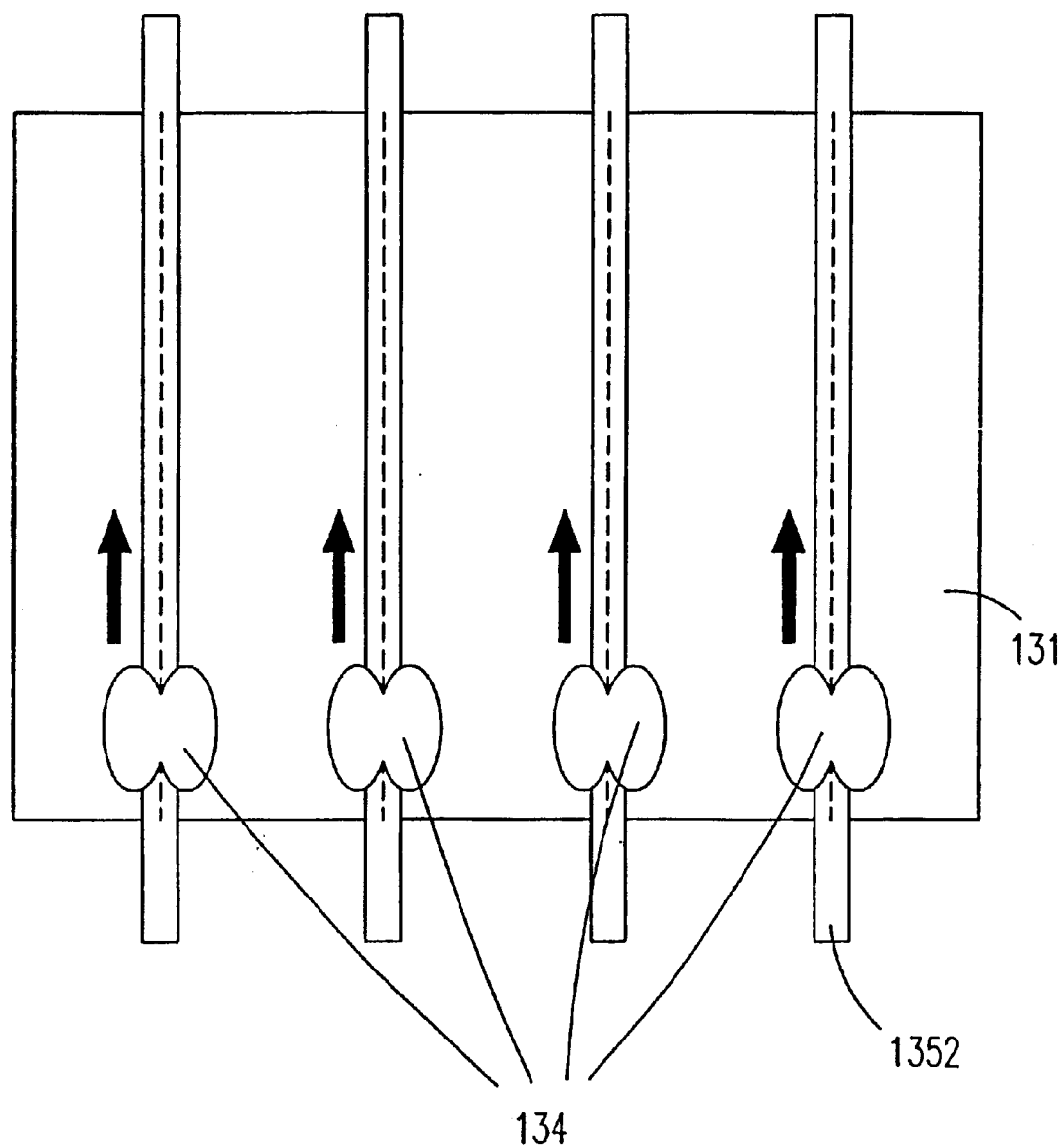
FIG. 14 is a schematic view showing a process for cutting substrates by employing plural breaking rollers according to another preferred embodiment of the present invention.
Figure 15:
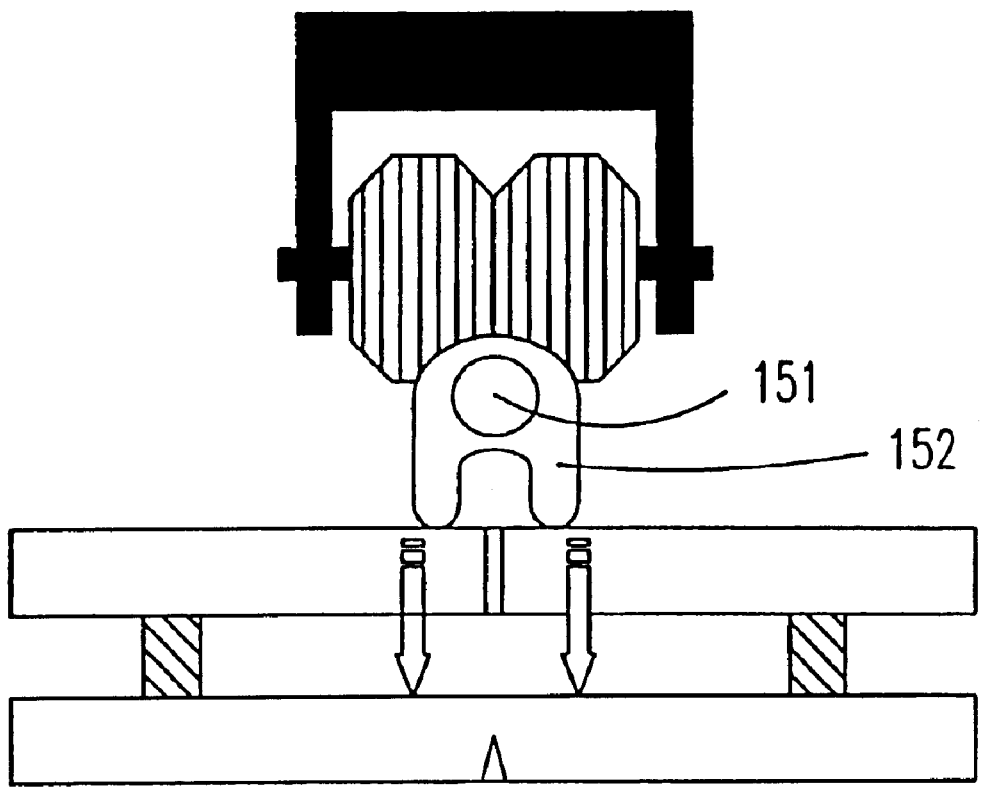
FIG. 15 is a schematic view showing a process for cutting substrates by employing a breaking roller and a buffer device according to another preferred embodiment of the present invention.
Figure 16:
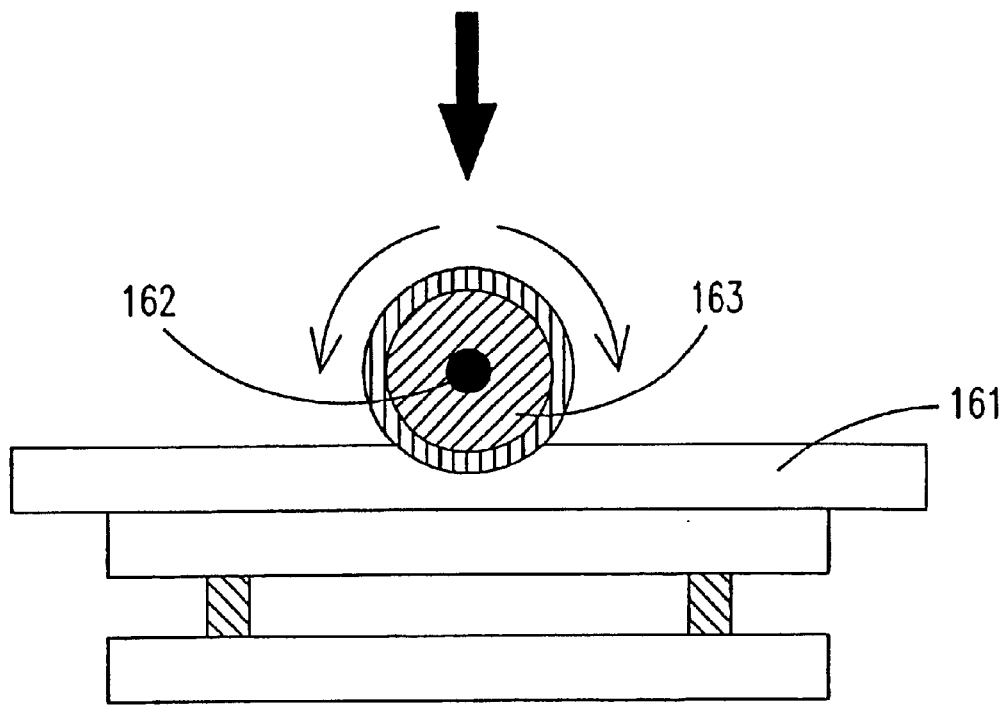
FIG. 16 is a schematic view showing a process for cutting substrates by employing a breaking roller and a buffer device according to another preferred embodiment of the present invention.

Alternatively, plural breaking bar can be employed to provide the external force upon the substrate 131, as shown in FIG. 14, so that the external force exerted on the substrate 131 is equally spread over the surface of the substrate 131. In addition, as shown in FIG. 15, the buffer device can be changed to have a steel wire 151 encapsulated with a polymer sheath 152. By employing the polymer sheath 152 and steel wire 151, the external force exerted upon the substrate can be dispersed over the surface of the substrate. Therefore, the impact between the breaking bar and the substrate and the situation of forming irregular cross-section on the substrate due to the concentration of stress can be avoided. Certainly, the buffer device can also be changed to has a tape 161, a steel wire 162 encapsulated with a polymer sheath 163 as shown in FIG. 16.

While the invention has been described in terms of what are presently considered to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structure.

What is claimed is:

1. A method for separating substrates in liquid crystal display, comprising steps of:

providing a first substrate and a second substrate, said first and said second substrates being combined together by seal;

forming a scribing line on said first substrate;

providing an attaching medium on said second substrate; and separating said first substrate into at least two parts along said scribing line by exerting an external force upon said second substrate, wherein said external force is spread over the surface of said second substrate through said attaching medium.

2. The method according to claim 1, wherein said external force is provided by one selected from a group consisting of an air nozzle, plural air nozzles, an air membrane, plural air membranes, a breaking bar, a roller and plural rollers.

3. The method according to claim 2, wherein said breaking bar has a vibratility.

4. The method according to claim 2, wherein said breaking bar has at least one extending portion.

5. The method according to claim 2, wherein said breaking bar has a contact portion made of polymer.

6. The method according to claim 2, wherein said roller is fixed on a supporter.

7. The method according to claim 6, wherein said supporter is a device moving along said scribing line.

8. The method according to claim 1, wherein said attaching medium is selected from the group consisting of a tape a steel wire and a combination thereof.

9. The method according to claim 8, wherein said tape has one of flat-shape and arc-shape.

10. The method according to claim 1, wherein said attaching medium is selected from the group consisting of a tape a steel wire encapsulated with a polymer sheath, and a combination thereof.

11. The method according to claim 1, wherein said first substrate and said second substrate are the substrates pervious to light.

12. The method according to claim 11, wherein said first and said second substrates are glass substrates.

13. The method according to claim 1, wherein said step of forming said scribing line on said first substrate is performed by one selected from a group consisting of a diamond blade, a hard metal wheel, and a laser.

14. The method according to claim 13, wherein said hard metal wheel is made of Tungsten Carbide.

* * * * *